July 3, 1934.     G. MEYER-JAGENBERG     1,964,925
MACHINE FOR PACKING CIGARETTES INTO BOXES
Filed Sept. 30, 1931     11 Sheets-Sheet 1

Inventor
G. Meyer-Jagenberg.
By
Attorney

July 3, 1934. G. MEYER-JAGENBERG 1,964,925
MACHINE FOR PACKING CIGARETTES INTO BOXES
Filed Sept. 30, 1931 11 Sheets-Sheet 3

Inventor
G. Meyer-Jagenberg.
By
Attorney

July 3, 1934.  G. MEYER-JAGENBERG  1,964,925
MACHINE FOR PACKING CIGARETTES INTO BOXES
Filed Sept. 30, 1931  11 Sheets-Sheet 8

Inventor
G. Meyer-Jagenberg.
By
Attorney

July 3, 1934.  G. MEYER-JAGENBERG  1,964,925
MACHINE FOR PACKING CIGARETTES INTO BOXES
Filed Sept. 30, 1931  11 Sheets-Sheet 9

Inventor
G. Meyer-Jagenberg.

Attorney

Patented July 3, 1934

1,964,925

UNITED STATES PATENT OFFICE 1,964,925

MACHINE FOR PACKING CIGARETTES INTO BOXES

Gunther Meyer-Jagenberg, Dusseldorf, Germany

Application September 30, 1931, Serial No. 566,143
In Austria May 30, 1931

15 Claims. (Cl. 226—5)

This invention is directed to an improvement in machines for packing cigarettes into boxes and particularly into boxes of the hinged lid type, the machine being automatic in its action and the successive packing operations being carried out in regular sequence to insure continuous operation and maximum output.

In packing cigarettes, particularly where the cigarettes bear inscriptions, it is difficult, outside of hand packing, to arrange the top layer of cigarettes in the package so that on opening the package all the inscriptions are visible. This arrangement of cigarettes is necessary for proper display and appearance, and one of the primary objects of the present invention is the provision of means, selectively controlled by an operator, in which the cigarettes designed to provide the upper layer may be automatically turned after delivery from the hopper and before delivery to the package in order that the inscriptive indicia on the cigarette may be substantially uppermost.

A further requisite in packaging cigarettes in this type of container is the necessity for placing within the container the usual protective layers to be folded about the cigarettes for their protection while in the container.

It is a further object of the present invention to provide means by which this wrapping material may be automatically placed in the container prior to the application of the first layer of the cigarettes.

In cigarette packages of this type, it is a usual expedient to place a dividing sheet between the respective layers of the cigarettes within the package, such dividing sheet being usually employed for advertising purposes.

A further object of the present invention is the provision of means by which this dividing sheet may be introduced into the package following the positioning of the lower layer of cigarettes.

Another object of the invention is the provision of means initially serving to open the hinged lid of the container or box to provide for the subsequent operations and following the completion of such operations to close the hinged lid upon the box proper to complete the operation.

The machine as a whole is arranged to automatically take care of the several necessary operations in sequence, each operation occurring at a selected station of the machine and no single operation interfering with any other operation, so that with a proper supply of boxes and cigarettes the packing of the cigarettes may continue uninterruptedly as long as the machine is operating, resulting in a continuous output of packed cigarettes in closed containers or boxes.

A further object of the invention is the provision of means for automatically interrupting the operation of the machine in the event the number of cigarettes in the first layer is less than the proper number for such layer, thereby avoiding improperly filled boxes and insuring that immediate attention is called to the fact by the failure of the machine to continue the packing operation.

The invention is illustrated in the accompanying drawings, in which:—

The machine as a whole is so arranged that the various operations are carried out at what will be hereinafter termed "stations" and at each of which a particular single operation is performed. These stations for convenience are more particularly identified in Figures 1, 2, 3 and 19 by Roman numerals, with the following operations carried out at each of the particular stations:—

At station I the empty box is opened, that is, the lid is turned back to expose the interior of the box to permit the successive steps. At station II the cross lining strip is inserted in the box proper. At station III the longitudinal lining strip of the box is inserted to overlie the cross lining strip. At station IV the lower layer of cigarettes is delivered to and properly placed in the box proper. At station V the dividing sheet, with or without the advertising matter, is properly placed in the box proper above and resting on the lower layer of cigarettes. At station VI the top layer of cigarettes is transferred from the hopper to a conveyor chain. At station VII the cigarettes to form the top layer are delivered from the conveyor into the device for properly positioning the cigarettes so that the inscriptive indicia may be uppermost. At station VIII the cigarettes are delivered to the turning over device and are selectively operated upon, if necessary, to insure that such cigarettes may be properly positioned with relation to such inscriptive indicia. At station IX the cigarettes to form the top layer in the box are moved together or assembled in contacting relation to provide for their being conveniently placed in the box. At station X the cigarettes assembled at station IX are delivered into the box to form the top layer of cigarettes. At station XI the box of either form is properly closed.

The machine includes a table T supported on suitable framework and beneath which table near what may be termed the initial or entrant end of the machine is mounted a transverse shaft 2, provided at one end beyond the table with a pulley 1 driven by a motor M, the opposite end of the shaft beyond the table being provided with a hand wheel 6, with which the shaft, and thereby the various mechanisms of the machine, may be relatively set or adjusted whenever necessary or desirable.

The shaft 3 arranged parallel to and adjacent the shaft 1 is driven from the shaft 1 by appropriate gearing, and shaft 3, through beveled gearing 3', drives a shaft 4 extending longitudinally of the machine and adjacent one edge of the table. The shaft 4 through gearing 4' operates shaft 101 arranged beneath and adjacent the opposite edge of the table, the shaft 101 extending parallel to the shaft 4.

Longitudinally of the table is a depressed guideway, the marginal walls 35 of which define a space for slidably receiving the box, and beneath this guideway is a bar 5 provided with upstanding projections 5ª which extend through a slot in the bottom of the guideway and serve as the box advancing means. The bar 5ª is operated through the medium of a cam through which said bar is initially raised to cause the projections 5ª to extend above the bottom of the guideway, then moved forwardly to advance the boxes lengthwise the guideway a predetermined distance, then permitted to move downwardly to withdraw the projections 5ª from the guideway, and then moved rearwardly to the original position. This cycle of movement of the bar is continuously repeated so that the projections 5ª on said bar will intermittently advance the boxes in the guideway from one station to the next, the boxes remaining at rest at the particular stations during the suceeding movements of the bar 5 in order to permit the various operations of the respective stations to be carried out.

The boxes S of either of the forms shown are arranged in superimposed relation, the boxes being closed, in a hopper 7 adjacent the initial or entrant end of the guideway and the lowermost box is moved into the guideway by a plunger 8 operated by a cam 8' on the shaft 4. The boxes are positioned in the hopper 7 so that when opened the lids and boxes proper will both rest in the guideway.

Figure 4:
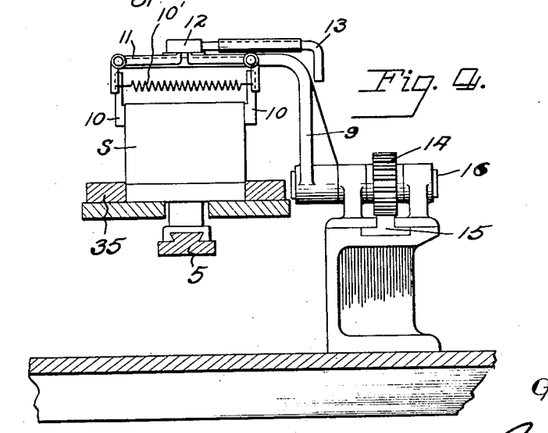
Figure 4 is a detail in elevation, partly in section, showing the means for opening the lid of the box.

Following the delivery of the boxes to the initial station, the first operation of the machine is the opening of the boxes to expose the interior of the box proper for the packing operation. The mechanism to accomplish this result is shown more particularly in Figures 2 and 4, wherein the lid of the closed box now positioned in the guideway is gripped on opposite sides between gripping elements 10 carried by bell crank levers 11 pivotally supported on one bar of an angle arm 9 connected to a shaft 16 mounted for rotation in suitable bearings and provided intermediate the bearings with a pinion 14 engaged by a rack 15 reciprocated by a cam 15' on the shaft 3. The gripping elements 10 are held in gripping relation by a spring 10' arranged intermediate said elements and terminally connected thereto and are opened to release the lid of the box after the latter has been raised from the box proper and turned down into the guideway through the medium of a rocker arm 13 supported for rocking movement in a sleeve secured to the arm 9 and terminally provided with a stop 12, which on movement in one direction permits the gripper arms to engage the box lid and on movement in the opposite direction forces the inner ends of bell crank levers apart to thereby move the gripping elements from contact with the box lid. The rocker arm 13 has a crank end designed to engage stops 17 on the table in the respective movements of the arm 9.

Figure 2:
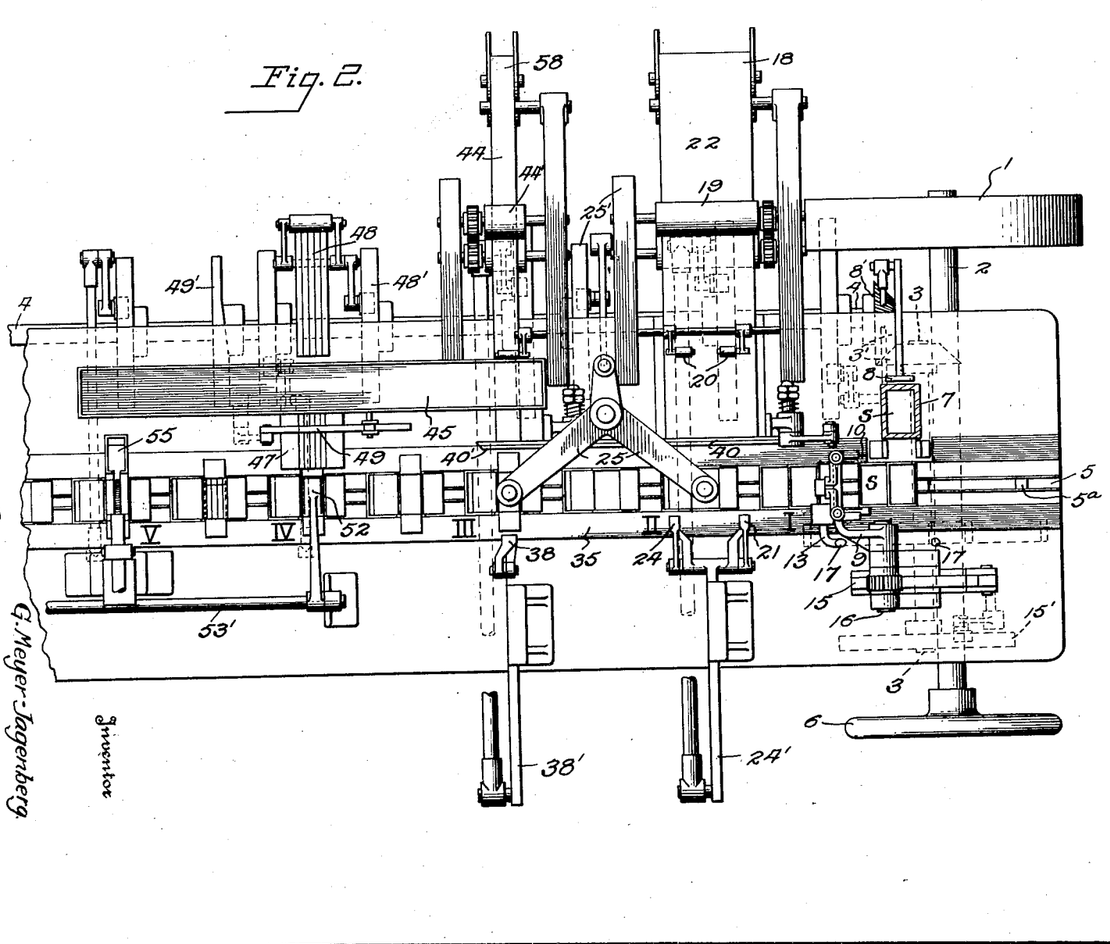
Figure 2 is an enlarged plan view of the right hand end of the machine as shown in Figure 1.

As the box is delivered to the guideway, the gripper arms are arranged in the position opposite that shown in Figure 2, the rack 15 moving to cause the bell crank end of the rocker arm 13 to engage the right hand stop 17 of Figure 2. This moves the bell crank levers into position to cause the grippers to engage the lid of the box, and in the further movement of the cam 15' the rack 15 is moved, turning the arm 9 with the grippers and with the box top to which the grippers are now applied into the position indicated in Figure 2, in which position the lid has been turned back from the box proper and is in the plane of the guideway, and as the crank end of the rocker arm 13 now engages the left hand stop 17, the bell crank levers 11 are operated to release the box. Thus at this stage the box is opened automatically to expose the interior of the box proper.

During this time the bar 5 is moving in the reverse or non-operative direction and now moves upwardly into contact with the box and moves the box longitudinally from this station I to the next or station II, and following this movement the bar 5 again moves downwardly, leaving the open box at rest at the station II. The operation performed at station II is to apply a lining strip to the box, such lining strip being indicated at 22 in Figure 5.

Figures 5, 6, 7:
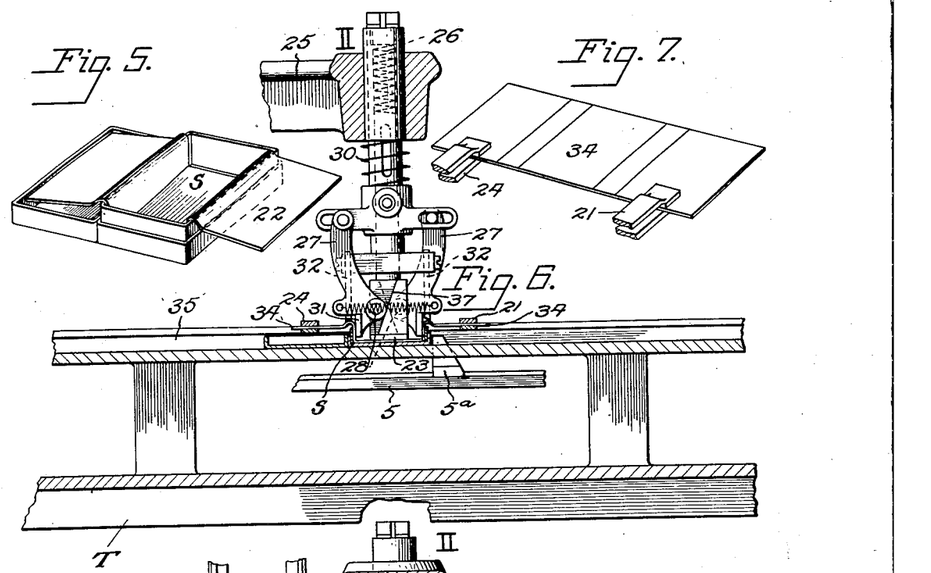
Figure 5 is a perspective view of the box with a lining strip in position therein.
Figure 6 is a view in longitudinal section, partly in elevation, illustrating the means for applying the lining strip to the box.
Figure 7 is a broken perspective of the lining strip showing the grippers connected thereto for drawing the strip into position to be placed within the box.

The mechanism operating to apply this lining strip to the box is shown more particularly in Figures 2, 6 and 7. This lining strip 22, which is preferably of tinfoil, forms a part of a continuous roll of such material wound upon a drum 18 supported at one side of the table. Arranged in advance of the roll 18 are intergeared feeding rolls 19, between which the strip is passed, and which rolls are suitably driven from shaft 4 to maintain a feeding action on the material.

Pressure rolls 20 are mounted for bodily swinging movement toward and from the material and designed in operative position to bear upon the material and hold the material from retrograde movement and are also operated by suitable means from the shaft 4.

The width of the sheet 22 is equal to the desired length of the lining strip being applied. This width, as indicated in Figure 5, is sufficient to fit the lining within the box to provide a projecting portion in the lid and a projecting portion beyond the opposite edge of the box proper. Thus the width of the strip of material is disposed lengthwise of the guideway. The strip is drawn into position above the box by two grippers 21 and 24 moved through the medium of mechanism, indicated at 24', operated from a cam on shaft 4 and arranged to grip the end of the material 22 at points beyond that portion of the material which will be placed within the box proper, such latter portion of the material being indicated by the transverse lines appearing in Figure 7.

In the operation at this station II, the grippers are advanced transversely of the table and caused to grip the end of the material and are then moved to a position so that the material overlies the box open lid and also projects in the opposite direction beyond the box. In this position gripper 21 which engages that portion of the material beyond the free edge of the box is released, whereupon an arm 25 operated from cams 25' on shaft 4 is moved downwardly, depressing a plunger carrying a plate 23 at its lower end which substantially fits the bottom of the box, with the result that the lining is forced to the bottom of the box.

Following the operation of the plate 23, the continued movement of the arm 25 operates an interior rod carrying a wedge-shaped terminal 37 which serves to spread the lower ends of levers 27 against the tension of a spring. The lower ends of the levers 27 are formed with pressure plates 31 which, as the levers are spread, force the lining into close proper contact with the upstanding side walls of the box, the movement of the plate 23 having also positioned edge bearing sections 32 into contact with the material overlying the edges of the side walls of the box.

Previous to this fitting of the lining into the box, the clamp 21 has been opened to provide the necessary endwise movement of the strip during the fitting operation, and following this fitting operation the clamp 24 is released and the arm 25 elevated to withdraw the former from the box. The lining strip 22 is then accurately fitted to the bottom and side walls of the box with overhanging portions, one resting in the box cover and the other projecting beyond the opposite free edge of the box, as illustrated in Figure 5. By reason of the clamping cooperation of the projecting portions of the lining beyond the box proper and the fitting of the lining strip accurately along the edges of the box, the ends of the strip beyond the box remain level and horizontal. The proper sequence of the operating parts of the folder is controlled by the springs 26 and 30, the former yielding only after the latter has reached a state of compression incident to the initial placement of the plates 23.

Figure 8:
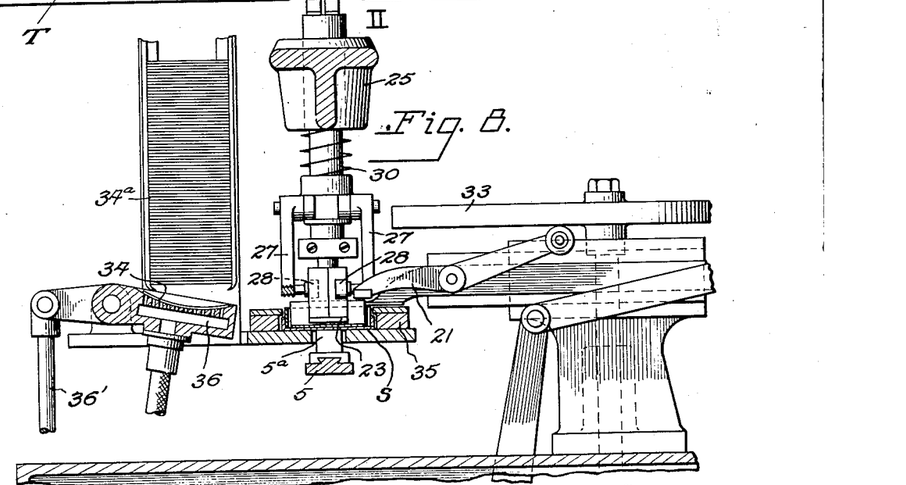
Figure 8 is a view in elevation, partly in section, showing a slightly modified means for delivering a lining strip to the box.

Immediately succeeding the placing of the lining strip 22 in the box, the strip is severed by a longitudinally operating knife 40 reciprocated by a lever 42 driven by a roller 41 cooperating with a cam 29 on shaft 4. If desired, and as illustrated in Figure 8, the lining 22, instead of being fed from a roll as described may be cut into sheets of proper size and shape and delivered from a container in which the sheets are arranged in superimposed relation. The delivery means constitutes a suction element 36 which withdraws the bottom sheet and which is advanced through mechanism 36' operated from shaft 4. In this form the sheets 34ª are withdrawn singly by the suction device, the upper surface of which is perforated at 34, and being delivered to the grippers 21 and 24 are operated by the mechanism described in connection with the form shown in Figure 6.

Figures 9, 10:
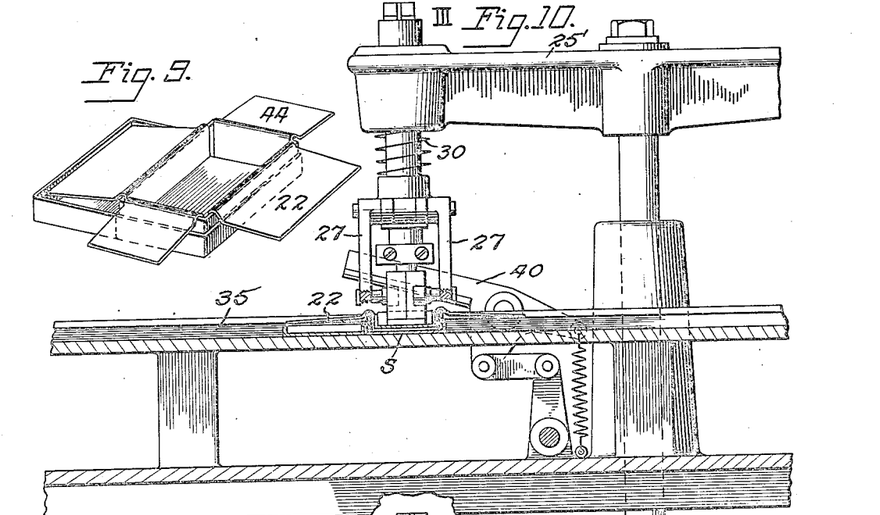
Figure 9 is a perspective view of the box showing the same provided with a second lining strip, the length of which is at right angles to the length of the first lining strip.
Figure 10 is a view in elevation partly in section showing the means for applying the second lining strip to the box.
Figure 11:
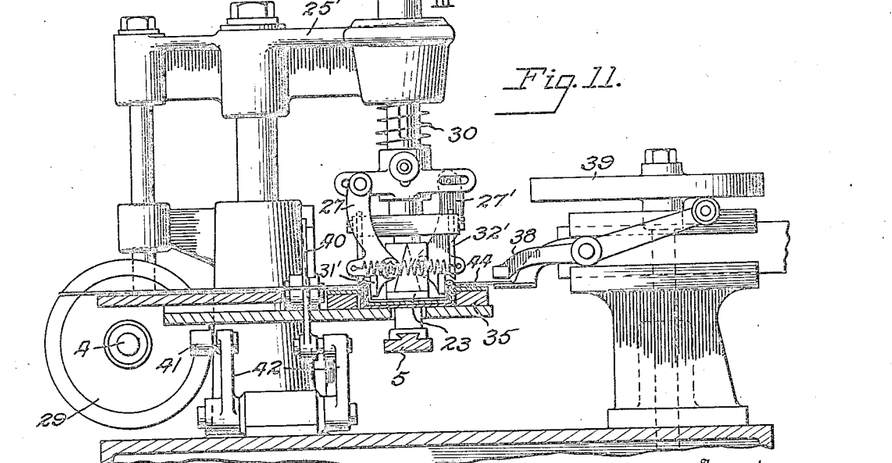
Figure 11 is a view taken at right angles to Figure 10, showing more particularly the means for severing the second lining strip and also the means for accurately placing said second lining strip in the box.

Immediately succeeding the operation of the parts for applying the initial lining at station II, the feeding bar 5 again operates to move the box with the initial lining strip longitudinally of the guideway to station III. At station III a cross lining 44 is placed in the box above the lining 22, as indicated in Figure 9. This cross lining material is drawn off a roll 58 by a gripper 38 operated by mechanism 38' driven from the shaft 4. The material 44 has the usual driven feed wheels 44' and the gripping rollers 45' functioning similarly to the identical parts in connection with the material 22. The material of the cross lining strip 44 has a width corresponding to the width of the box and is to be applied in position in the box so as to have end flaps projecting beyond the box walls. This material, of course, is drawn transversely of the box and has its length disposed transverse the length of the applied lining strip 22. The gripper 38 draws the material, after severing such material by a knife 40' operated with and forming part of the knife 40 for the material 22, across the box and an arm 25' identical with and operated by the same means as arm 25 for the operating mechanism of station III depresses a plate 23 into the box to set the lining strip 44 against the bottom and then presses a bar to rock levers 27' to cause plates 31' on the ends of the levers to force portions of the lining strip 44 into intimate contact with the end walls and corners of the box, the depressible frame 32' bearing at the same time upon the upper edges of the end walls to define sharp bends in the material necessary to maintain the proper position of the cross lining strip 44. The mechanism for placing this cross lining strip 44 is illustrated more particularly in Figures 10 and 11.

Following the operation of the mechanism at station III, the box has been supplied with the lining strips arranged transversely to each other and designed to underlie the cigarettes to be placed in the box, with the outstanding flaps of the strips to be folded inwardly over the upper layer of cigarettes in the final completion of the operation, as will later appear.

Figures 12, 13:
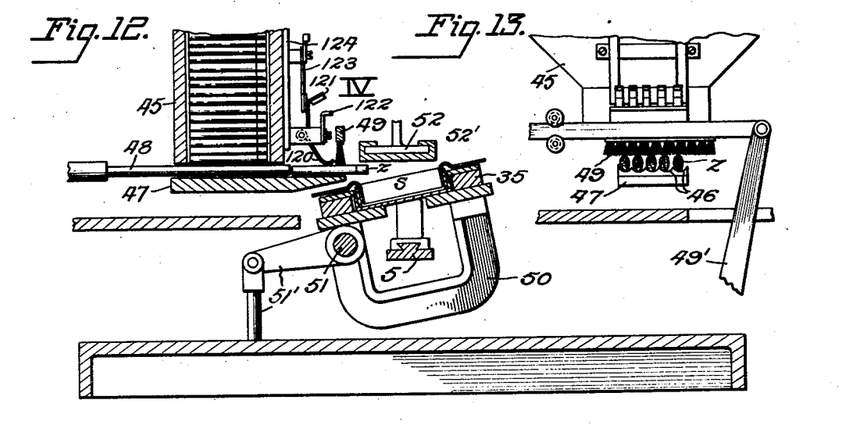
Figure 12 is a view in section, partly in elevation, showing the means for introducing the first or bottom layer of cigarettes into the box.
Figure 13 is a similar view taken at right angles to Figure 12 but showing more particularly the means for relatively adjusting the cigarettes immediately preceding their application to the box.

Following the placement of the cross strip 44 in the box, the feeding bar 5 operates to move the box with the cross strips in position to the next station or station IV, at which station the lower layer of cigarettes are introduced into the box. The mechanism for placing the initial layer of cigarettes is shown more particularly in Figures 2, 12 and 13. At this station the cigarettes are stacked within a magazine 45, with the lower layer of such cigarettes in the magazine being in appropriate number for the proper filling of the lower layer of the box. This lower layer of cigarettes rests on a supporting plate 47 below the magazine 45 and above the table, with the plates 47 formed with grooves 46, a single cigarette, indicated at Z, lying in each groove. The cigarettes are normally slightly oval in shape, as shown in Figure 13, and when arranged in the grooves are in spaced relation, as shown in that figure. The cigarettes are forced over the plate 47, which extends beyond the magazine 45 to a position immediately adjacent the proximate edge of the guideway for the box, by plungers 48 operated by a cam 48' on shaft 4, there being one plunger for each cigarette to be ejected.

In order to facilitate the delivery of the cigarettes into the box, the guideway on which the box rests at this station is divided and arranged as a separate section supported upon a U-shaped member 50 rockable around a shaft 51 through the medium of an arm and rod 51' actuated from shaft 101. The tilting of the guideway section, and therefore of the box, is such that as the cigarettes move forwardly under the action of the plungers 48, the ends of the cigarettes are practically interrupted by the remote side wall of the box so that the ends of the cigarettes are aligned by said side wall and the cigarettes naturally drop into the body of the box.

In order that the cigarettes may be placed evenly on the bottom of the box, a plunger 52 having a resilient covering 52' is operated by an arm mounted on a shaft 53' rotatably supported on the table and extending also to station IX and driven from shaft 101 and moved into the box onto the cigarettes to force them lightly and evenly against the bottom of the box, the box, of course, having returned to a horizontal position by the return movement of the guide section immediately preceding the operation of the plunger. As the cigarettes are moved beyond the hopper 45 by the plungers 48, they are subjected to the action of a brushlike element 49 which moves across the cigarettes, that is, transversely of their length so that the cigarettes are moved into a contacting or slightly overlapping relation to facilitate their proper position within the box. The brush 49 is operated through mechanism 49' including a cam on shaft 4.

Following the action of the mechanism for loading the initial or lower layer of cigarettes at station IV, the feed bar 5 operates to again move the box with the lower layer of cigarettes to station V, at which station the strip to be arranged between the lower and upper layers of cigarettes is to be applied. The mechanism is illustrated more particularly in Figures 14, 15 and 16, wherein the strips or cards, which may carry advertising or any preferred data, are supported in superimposed relation in an appropriately formed chute 55, the axial line of which is at an inclination to the guideway in which the box is arranged. The cards are removed from the chute in succession by a suction element 54, the upper surface of which is hollowed to facilitate the removal of the cards. This suction device is operated from the shaft 4, moved to a position immediately adjacent the bottom of the chute 55, and by the suction withdraws the lowermost card. The suction device with the card is then moved to a position immediately above the box, the card being held against possible separation from the suction device and being guided by a guard plate 56 projecting from the chute 55 having its side edges downturned to insure that the card will be properly held in direct alignment with the box proper.

Figures 14, 15, 16:
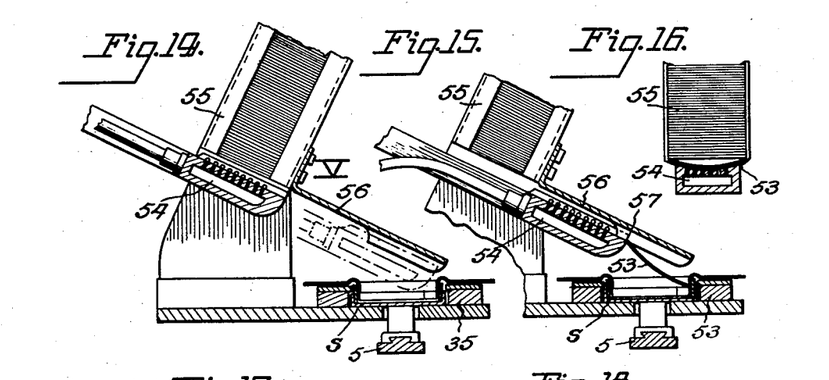
Figure 14 is a view in section, partly in elevation, showing the means for applying the dividing card or strip onto the lower layer of cigarettes in the box, the strip selecting means being in the initial position in full lines and in final or delivery position in dotted lines.
Figure 15 is a similar view showing the strip selecting means in the position occupied immediately preceding the final release of the dividing strip onto the lower layer of cigarettes in the box.
Figure 16 is a transverse sectional view through the bulk receiving means, the suction means for removing the lowermost strip being shown in position.

As the suction device reaches the limit of movement, as indicated in dotted lines in Figure 14, the suction is released, whereupon due to the inclination of the suction device, the card moves toward the adjacent wall of the box as the suction device moves back to its normal position. The card is thus delivered incident to the rearward movement of the suction device directly into the box and thus rests upon the lower layer of cigarettes.

The box with the lining strips and the lower layer of cigarettes with the superimposed card is now moved from station V by the feed bar to station X, which is the next station in which the box or packing of cigarettes is in any way affected and at which station X the upper and final layer of cigarettes is placed in the box. Prior to the placing of the final layer of cigarettes in the box, however, the cigarettes forming this layer are acted on by the mechanism at stations VI, VII, VIII and IX, and it is understood that the cigarettes of the final layer as controlled by the mechanism at these intermediate stations VI, VII, VIII and IX are being affected during the operation of the machine so that as the box reaches station IX the cigarettes of the upper layer are ready for filling into the box.

Figure 3:
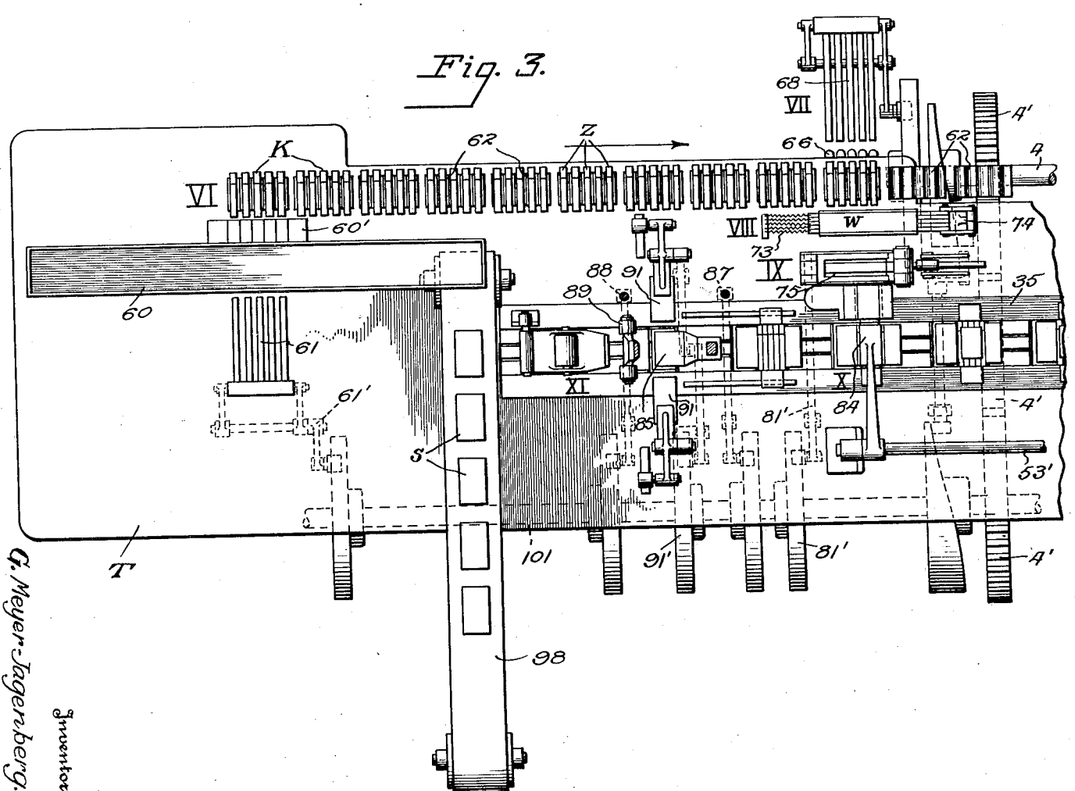
Figure 3 is a similar view of the left hand end of the machine as shown in Figure 1.

With particular reference to Figure 3, it will be noted that an endless carrier K is arranged for travel lengthwise the machine parallel to one edge thereof, being suitably driven by gears from shaft 4. This carrier is made up of connected members 62, each of which is formed with a rounded channel 63 extending transverse the carrier and of a size to readily receive a single cigarette. The carrier is intermittently operated, dwelling at each of the stations VI and VII to permit the desired operation to be described.

At station VI the cigarettes forming the upper layer are delivered from a hopper 60 through a grooved guiding extension 60' into the channels 63 of the aligned portion of the carrier by plungers 61 operated by mechanism 61' from shaft 101, as clearly shown in Figure 3. The cigarettes of the type which the present machine is more particularly designed to pack are generally marked with a suitable inscription, such as some identifying characteristic, name or other matter, and it is of importance that the top layer of cigarettes be so arranged in the box that these inscriptions be uppermost, and an essential feature of the present machine is the mechanism by which selective cigarettes which have been delivered to the carrier with the inscriptions lowermost may be turned before the cigarettes are delivered to the box.

Figures 20, 21, 37:
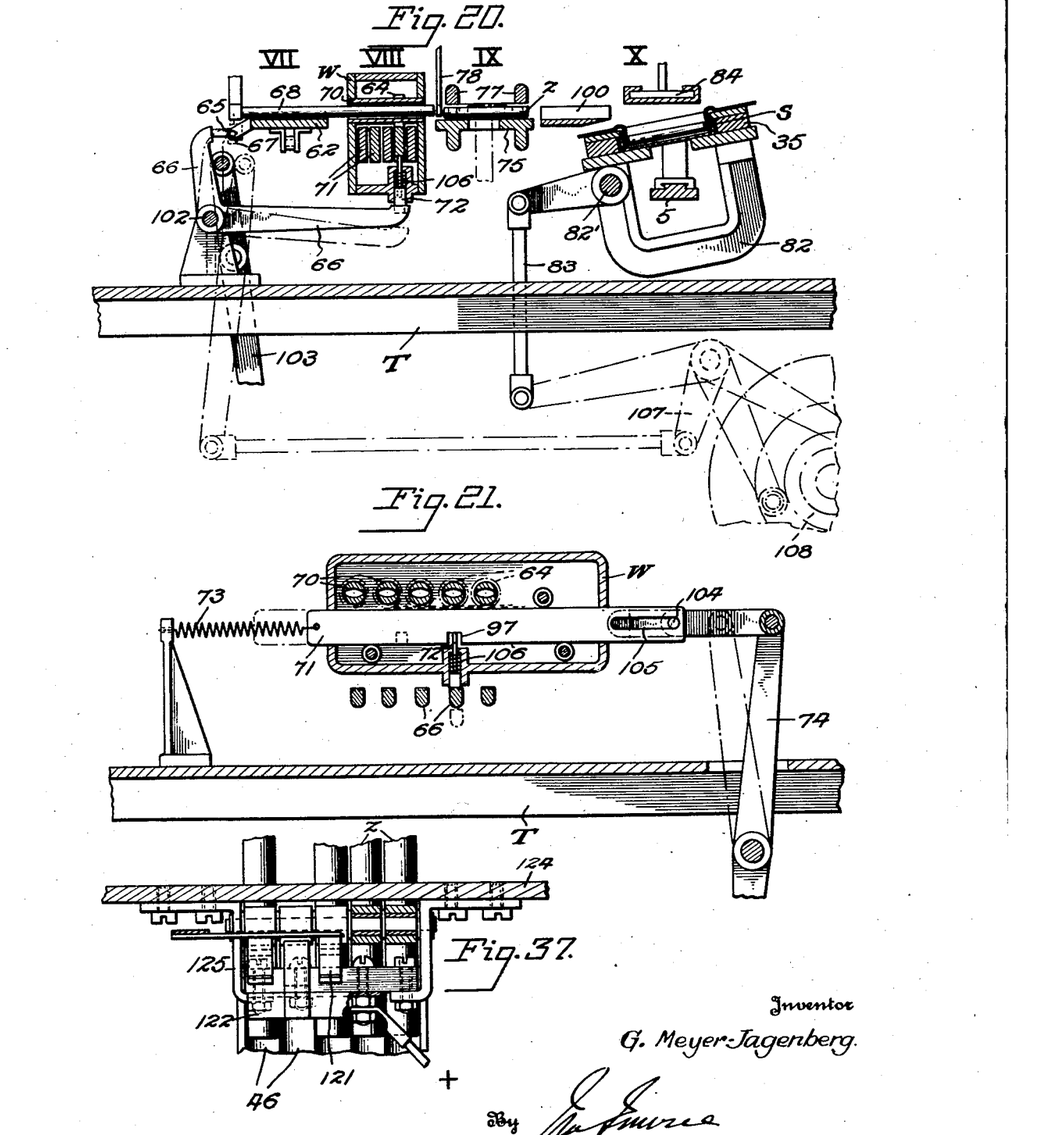
Figure 20 is a sectional view on the line 20—20 of Figure 19.
Figure 21 is a sectional view on the line 21—21 of Figure 19.
Figure 37 is a plan view of the same.

In providing for this result, each member 62 of the carrier in line with the cigarette-receiving channel 63 is provided with a finger piece 65 pivotally supported on a pin 67 mounted in projecting arms of the carrier member 62. The finger piece 65 is thus capable of assuming a position parallel to the cigarettes, as indicated in full lines in Figure 20, or a position at right angles to the plane of the cigarettes, as indicated in dotted lines in that figure. Following the delivery of the proper number of cigarettes to the carrier at station VI, an operator positioned between the stations VI and VII inspects each cigarette as the carrier passes, and where a cigarette is arranged with the inscription out of sight or on the lower portion of the cigarette, the finger piece 65 in line with that particular cigarette is turned upwardly by the operator. Preferably the finger piece is weighted, as indicated in Figure 20, so that it will remain in either position against casual displacement. The carrier with the contained cigarettes then moves to station VII, which is in a direction toward the front of the machine and, as will be seen from Figure 19, stations VII, VIII, IX and X are substantially aligned transversely of the machine.

Arranged at one side of the carrier in alignment transversely of the machine of that portion of the carrier which may be said to be at station VII is the mechanism for turning the cigarettes which have been selected by the operator through the manipulation of the finger pieces 65, as previously described. This turning device is illustrated more particularly in Figures 20 and 21, and includes a housing W in which is mounted a series of rotatable cylindrical holders 70, each provided with a pinion 64. Slidably supported in the housing W and extending in both directions beyond the ends of the housing are a series of turning bars 71, the upper surfaces of which are formed as racks to cooperate with the pinions 64.

It is understood that the cylindrical holders 70 are arranged in direct alignment with the cigarettes Z in the channels 63 of that portion of the carrier temporarily stopped at station VII and that, of course, these holders 70 correspond in number to the desired number of cigarettes to be placed in the upper layer of the box. Furthermore, the pinion of each holder is controlled by one turning bar 71 so that in the longitudinal operation of a particular turning bar, a particular holder will be turned by the engagement of the rack on that bar with the pinion of that particular holder. Each turning bar 71 is held against longitudinal movement by a pin 72 slidable in an offset of the lower wall of the housing W, engaging a recess 97 in the lower edge of the bar. The pins 72 are headed and project below the guiding extension in the housing and are adapted to move downwardly to free the particular bars with which they cooperate through the medium of spring 106.

The turning bars 71 are operated for the cigarette turning function by springs 73 connected to an upright B rising from the table, the movement of the turning bars under the influence of the springs 73 being limited by a pin 104 carried by a link at the upper end of a lever 74, with the pin engaging a slot 105 in each lever. The relation of the slot 105 and pin 104 is such as to limit the movement of the turning bars to permit only a half turn or a movement through 180° of the particular holder operated by that bar. The pins 72 are held in engagement with the notches 97 in the respective turning bars against the influence of the springs 106 by angle levers 66 pivotally supported at 102 on a bracket rising from the table, with the long arm of the levers underlying and engaging the head of the pins and the short arms of the levers projecting upwardly into a position to be immediately adjacent the free ends of the finger pieces 65 when the latter are in normal position.

Until the loaded portion of the carrier reaches station VII, the angle levers 66 are held in position to maintain the pins 72 in cooperation with the notches 97 by a bar at the upper end of a lever 103, which bar engages the short arms of the levers 66 and holds them in the described position. When the loaded portion of the carrier reaches station VII, the lever 103 through a link 107 operated from a cam 108 driven by shaft 4 is moved to the dotted line position in Figure 20, thus freeing the angle lever 66. As the loaded portion of the carrier is now in line with the angle levers, such angle levers as are in line with the finger pieces 65 which have not been turned upwardly are still prevented from moving on their pivots 102, while those angle levers in line with the finger pieces 65 which have been turned upwardly are free to swing on their pivots 102 incident to the weight of the longer arms of such angle levers aided by the spring 106 of the pin 71.

Simultaneously with the interruption of movement of the loaded portion of the carrier in line with the casing W, a plunger involving rods 68 moves through the loaded channels 63 of the carrier and moves the cigarettes into the holders 70 in the casing W. The angle levers 66 which have been permitted to move incident to the manual displacement of the finger pieces 65 permit the pins 72 to move out of the slots 97 in the selected turning bar. These bars are immediately moved under the influence of the connected spring 73 and serve to turn the holder connected therewith and the cigarette in such holder through an angle of 180°, thus arranging the inscription which was lowermost on the selected cigarette in the uppermost position. All cigarettes, of course, which have been selected by the operator through the manual manipulation of the finger piece 65 have been turned and all the cigarettes are then within the holders with the inscriptions in the uppermost position.

After the turning of the selected cigarettes of the particular group forming the upper layer, the lever 74 is operated to return the turning bars and thereby the holders to normal position and the lever 103 is correspondingly operated to move the angle lever 66 to normal position, which causes the pins 72 to again engage the notches 97 in the turning bars and arrange the parts for operation with the next group of cigarettes to be delivered to station VII by the carrier.

Figure 22:
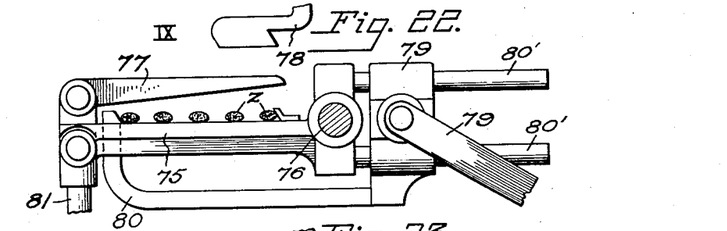
Figure 22 is a view in elevation of the means for assembling the cigarettes of the upper layer in compact form for delivery to the box, the parts being shown in initial position.
Figure 23:
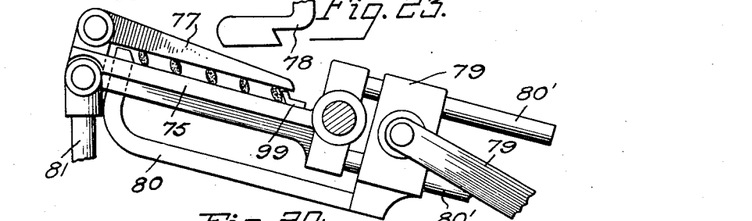
Figure 23 is a similar view with the parts shown in a second position.
Figure 24:
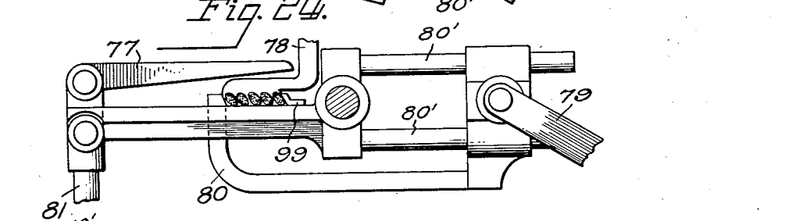
Figure 24 is a similar view with the parts shown in the third and final position.
Figure 25:
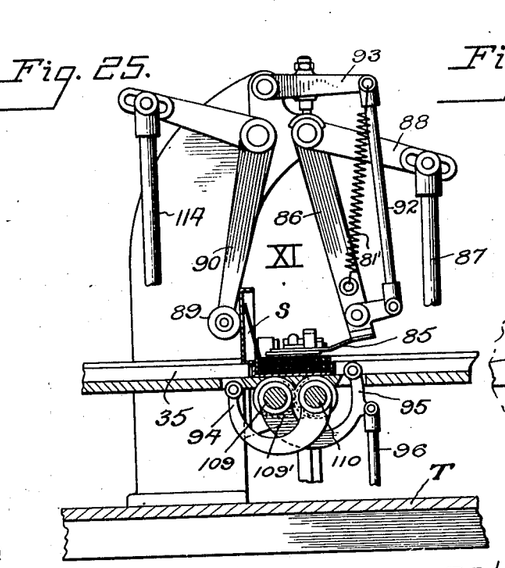
Figure 25 is a view in side elevation, partly in section, showing the means for folding the lid onto the filled box.
Figure 26:
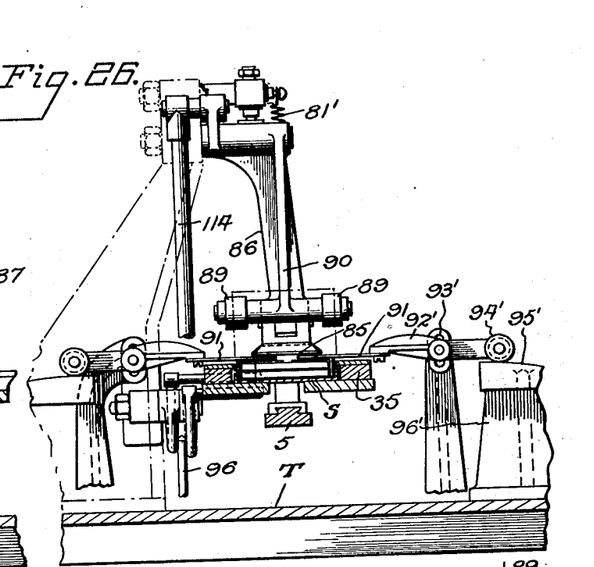
Figure 26 is a rear view of the same.
Figures 27, 28, 29:
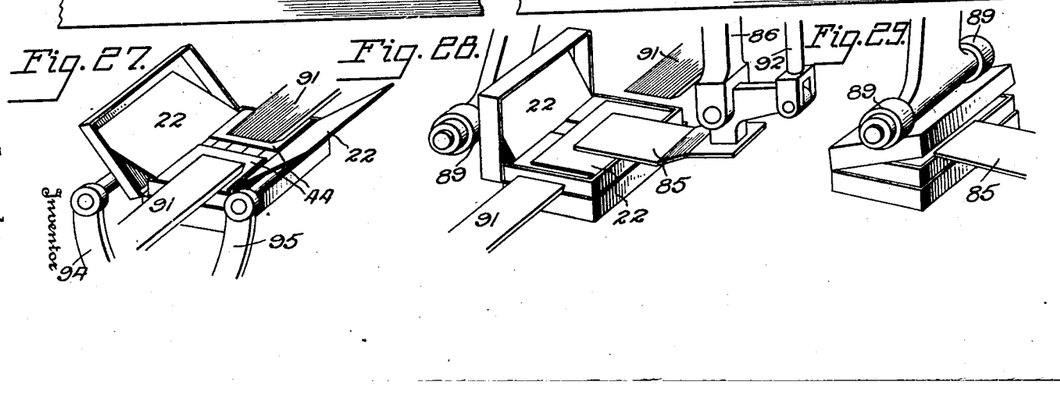
Figures 27, 28 and 29 show progressively successive steps of the means for completing the folding of the lining onto the cigarettes and the closing of the box lid.
Figure 30:
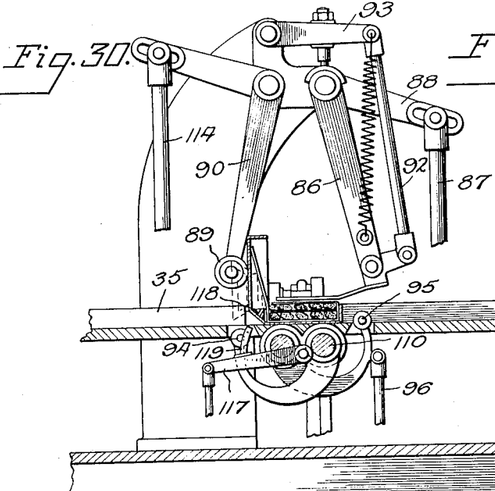
Figure 30 is a view in side elevation, partly in section, showing the means for completing the folding of the lid onto the box proper where the box is of the type shown in Figure 17.
Figure 31:
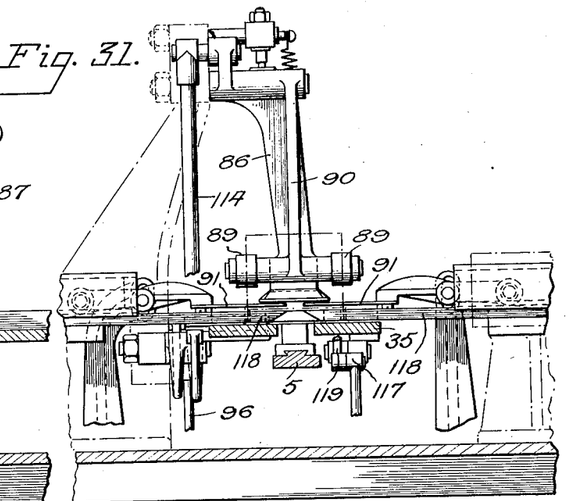
Figure 31 is a view in rear elevation of the same.
Figures 32, 33:
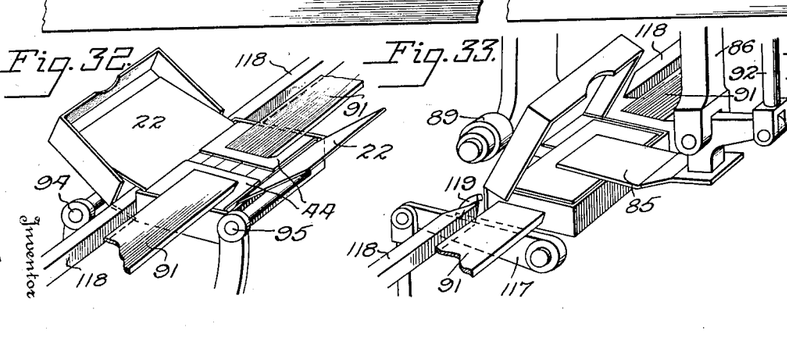
Figures 32, 33 and 34 show progressively successive steps in the means for folding the lining and closing the box lid onto the box proper where the box is of the type shown in Figure 17.
Figure 34:
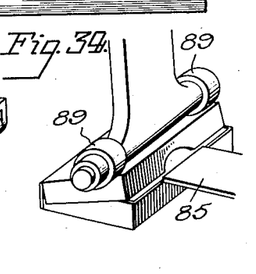

Following the turning operation at station VIII, the plungers 68 are again operated to force the cigarettes from the holders 70 and onto what may be termed the grouping mechanism shown more particularly in Figures 22, 23 and 24. This grouping element constitutes station IX and includes a plate 75 pivotally mounted on a shaft 76 and provided with an overlying arm 77 capable of a slight movement toward and from the plate, as illustrated in the figures referred to. The plate 75 is adapted for tilting movement by actuation of the rod 81 through mechanism 81' including a cam operated by shaft 101 to cause the cigarettes to be arranged in an inclined plane, the movement of the rod 81 causing the arm 77 to move down in light contact or just free of contact with the cigarettes. A sliding element in the form of a bar 80 having an upturned end passing through the plate 75 beyond the uppermost cigarette is then operated by a bar 79 connected to a slide 79' guided on bars 80', the movement of the upturned end of the bar 80 moving the cigarettes into contact against the stop 99 carried by the plate 75. The relation of the cigarettes as thus grouped is such that the cigarettes are relatively overlapped slightly, which is the correct position desired for the proper placing of the cigarettes in the box.

The cigarettes thus grouped are moved by the sliding member 78 over a plate 100 toward the box which, as previously stated, is at station X. Previous to the cooperation of the plate 78 with the cigarettes, the plate 75 has been returned to horizontal position through the operation of the rod 81 which serves to elevate the arms 77 and permit the passage of the projecting portion of the plate 78 below the arms and over the surface of the plate 75 in engagement with the ends of the cigarettes.

To facilitate the delivery of the cigarettes into the box, the section of the guide on which the box rests at station X is adapted for inclination, as described in connection with the lower layer of cigarettes, that is, this section of the guide is supported upon a U-shaped bracket 82 mounted for swinging about a shaft 82' through the medium of an arm, rod 83 and a cam arranged on the shaft 101. The tilting of the box obviously facilitates the delivery of the cigarettes thereinto, and following the delivery of the cigarettes into the box, a plunger 84 having a more or less flexible covering is moved downwardly to even up and properly align the upper surface of the cigarettes so placed. The filled box now moves to the station XI at which the projecting portions of the lining strips are laid over the cigarettes and the box is closed, this mechanism being illustrated more particularly in Figures 25 to 29 inclusive.

In the initial operation at station XI, the projecting portions of the lining sections 44 are folded over onto the cigarettes by folding bars 91 moved inwardly and outwardly by mechanism 91' including a cam on shaft 101. The folding bars 91 are supported on levers 92' pivotally and slidably mounted at the upper end of operating rods 93' and carrying at their remote ends rollers 94' moving over cam surfaces 95' on the upper end of pillars 96' rising from the table, with the cam movement of the rollers 94 such as to properly control the folding bars 91 for the folding operation. Immediately succeeding the action of the folding bars 91, swinging folder bars 94 and 95 move upwardly through slots in the bottom of the guideway just beyond the respective front and rear walls of the box. These arms are of segmental form and are loose on shafts 109 and 110 and intergeared at 109' for simultaneous movement, one of the arms, as 95, being connected to a rod 96 operated through suitable cam mechanism on shaft 101. The arms 94 and 95 are provided with terminal rollers and arm 94 acts to initially fold the projecting portion of the lining strip 22 over the interior of the box, while the arm 94 acts to initially move the box cover toward a closed position.

Supported upon a bracket rising from the table is a lever 93 connected by an arm 94 with an element pivoted upon the lower end of a lever 86 also pivotally supported on the bracket, which element carries a folding blade 85 to cooperate with the extended portion of the lining strip 22 initially folded by the terminal of the arm 95. The lever 86 is operated by an arm 88 through a rod 87 driven by a cam on the shaft 101 and a spring 86' connects the lever 93 and the lever 86.

Following the operative movement and return of the arm 95, the rod 87 is actuated to cause the arm 86 to swing toward and over the box. During the initial movement of the arm 86, the spring 81 acts to elevate the bar 92 and so depress the folding plate 85. As the lever 86 swings toward the top of the box, the folding plate 85 moves over the initially folded extension of the lining 22 and folds the latter smoothly onto the upper surface of the cigarettes or more particularly onto the upper surface of the folded sections of the lining 44. At the same time rod 114 operated through a cam mechanism on shaft 101 actuates a bell crank lever 90 pivoted on the bracket before referred to and carrying at its ends a cross bar having terminal rollers 89. These rollers engage the top of the box, which has been partly upturned or moved toward closed position by the arm 94, and cause the cover to be moved over and into close relation with the box. The box is thus completed and is moved beyond this station XI by the feeding bar 5 and delivered to a traveling conveyor or carrier for transportation beyond the machine.

Figure 17:
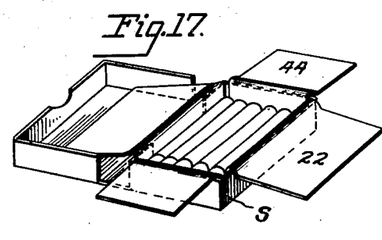
Figure 17 is a perspective view of the box with the lining strips in position and the lower layer of cigarettes applied, the box being of the type having one vertical hinged wall as well as a hinged cover.
Figure 18:
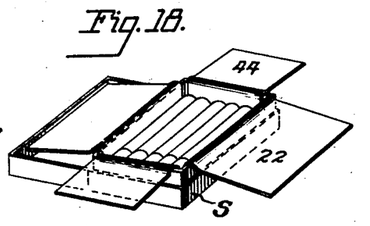
Figure 18 is a similar view with a box of the type having merely a hinged cover, the walls of the box proper being immovable.
Figure 19:
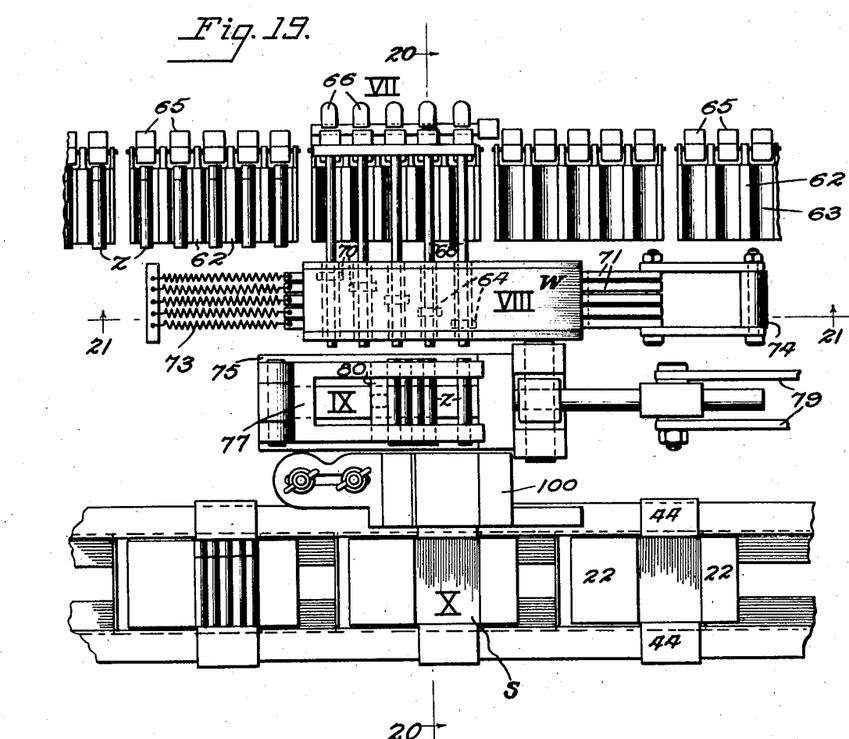
Figure 19 is a plan view illustrating the conveyor chain for the upper layer of cigarettes, the means for turning the cigarettes to arrange the inscriptive indicia uppermost, the means for assembling the properly positioned cigarettes in compact form, and the means for delivering such cigarettes into the box.

The same device with but a minor modification may be used for folding boxes composed of a one-piece blank according to Figure 17 (see Figures 30—34). A wedge-shaped flat tongue 118 is introduced from the side into the box past the filled in cigarettes, and thereupon the back connecting the cover with the bottom part of the box is bent over the edge of this tongue and folded. After said tongue has been withdrawn from the box, the rear wall is pressed in the above mentioned manner against the box and the cover closed by a finger 119 (Figure 33) serves for pressing on the rear wall of the box, this finger being swung against the rear wall of the box by the arm 117.

Figures 1, 35, 36:
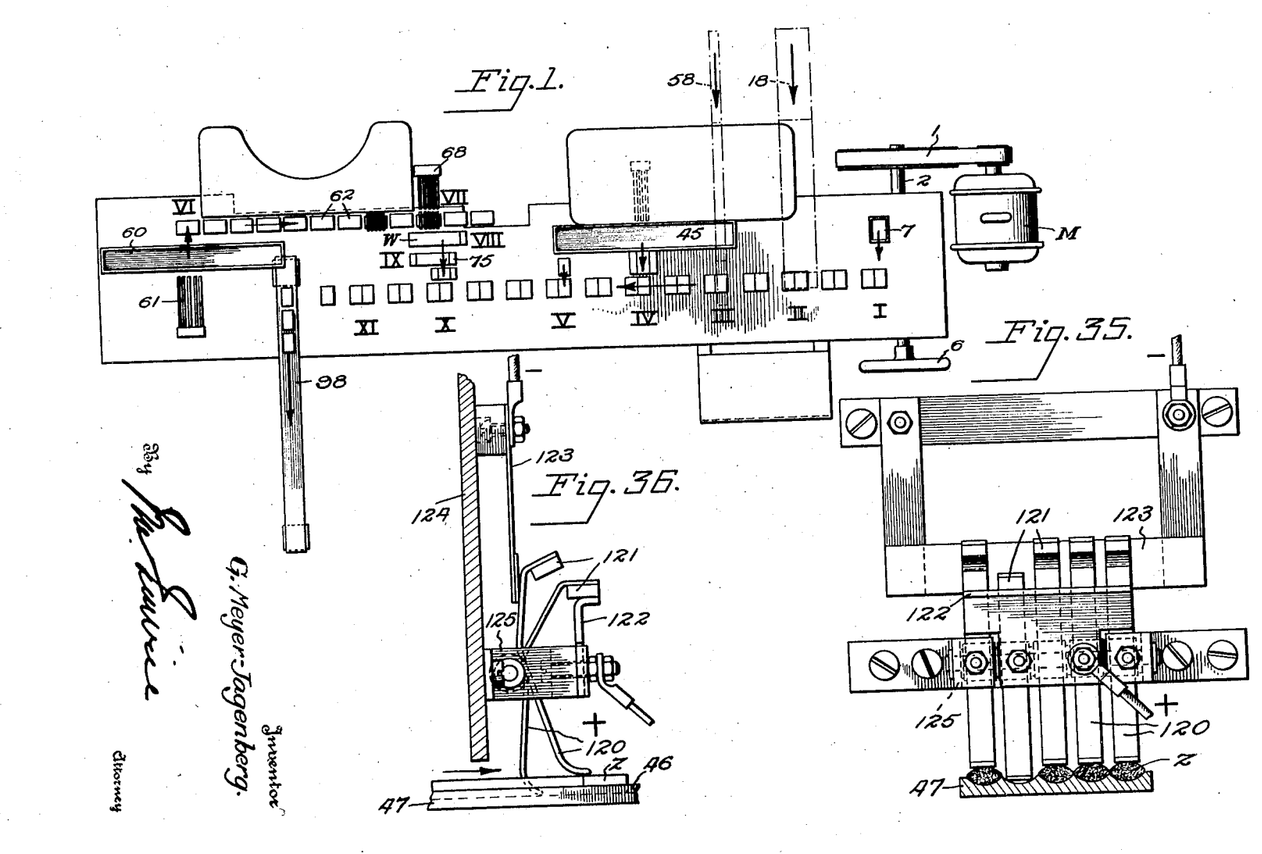
Figure 1 is a diagrammatic plan illustrating more particularly the separate stations at which the successive operations incident to packing the cigarettes into the box are carried out.
Figure 35 is a view in front elevation showing the means for automatically interrupting the operation of the machine in the event one or more cigarettes are missing from the appropriate number to complete a layer for the box.
Figure 36 is a side elevation of the same.

It is possible for one cigarette to be missing when the cigarette layer is removed from the housing. A feeler device, electrically actuated, is provided behind the magazine, by means of which, if a cigarette should be missing, a circuit is closed, energizing and tripping a relay whereby the motor driving the machine is stopped by suitable means. Such a feeler device is shown in Figures 12 and 35 to 37. A plate 124 of some suitable insulating material is mounted on the cigarette magazine and serves as a base plate for the device. A strap 125 is screwed on said base plate 124 (Figures 35 and 36). This strap or bracket is provided with a separate feeler 120, 121 for each cigarette, the feelers being mounted pivotally thereon. The individual feelers are electrically connected together. If a cigarette is missing in the layer taken from the magazine, then its respective feeler 120 is not tilted up, so that its upper arm 121 remains in contact with the contact bar 122, whereas the other feelers which are raised make contact with the bar or frame 123. Consequently, the current flows from the positive supply side through the contact bar or rail 122, and through the feeler 121 in contact with it, and then through the other feelers 121 and the bar or frame 123 in contact with said feelers, to the negative side of the supply, thus closing the circuit and tripping the relay.

I claim:—

1. In a machine for packing cigarettes into a box, a guideway, means for feeding a box longitudinally of the guideway, a carrier, means for delivering a predetermined number of cigarettes into the carrier to form a layer of cigarettes for delivery into the box, an element movable with the carrier and arranged adjacent each cigarette thereon, said element being manually operative from an inoperative to an operative position, a turning element for each cigarette, means for automatically operating the turning elements, means for normally locking the turning elements against operation, means controlled by the manually operable element on the carrier for releasing a selected turning element, means for delivering the cigarettes from the carrier into the turning elements, and means for delivering the cigarettes beyond the turning elements into the box.

2. In a machine for packing cigarettes into a box, a guideway, means for feeding a box longitudinally of the guideway, a carrier, means for delivering a predetermined number of cigarettes into the carrier to form a layer of cigarettes for delivery into the box, an element movable with the carrier and arranged adjacent each cigarette thereon, said element being manually operative from an inoperative to an operative position, a turning element for each cigarette, means for automatically operating the turning elements, means for normally locking the turning elements against operation, means controlled by the manually operable element on the carrier for releasing a selected turning element, means for delivering the cigarettes from the carrier into the turning elements, means for delivering the cigarettes beyond the turning elements into the box, and means for tilting the box transversely of the guideway during the delivery of the cigarettes thereinto.

3. In a machine for packing cigarettes, a carrier to which a predetermined number of cigarettes are delivered to form a layer for delivery of such into a box, a manually operable finger piece aligned with each cigarette on the carrier, cigarette turning means including a series of cigarette holders, a turning bar operatively connected with and serving to rotate each holder, means for operating the bars, locking means for holding the bars against operation, a lever for controlling each of said locking means, said levers being influenced by the selective operation of the finger pieces on the carrier, and means for delivering the cigarettes from the carrier to the holders whereby selected cigarettes of a particular layer may be turned in the operation of the holders to arrange all the cigarettes of the layer in a predetermined relation.

4. A machine for packing cigarettes in independent layers into a box having a hinged lid including a guideway, means for delivering the box to the guideway, means for opening the lid of the box to expose the interior of the box, means for applying independent relatively transverse lining strips to the box, means for delivering one layer of cigarettes to the box, means for inserting a card into the box to overlie said layer, means for thereafter inserting a second layer of cigarettes into the box, and means for closing the box.

5. A machine for packing cigarettes in independent layers into a box having a hinged lid including a guideway, means for delivering the box to the guideway, means for opening the lid of the box to expose the interior of the box, means for applying independent relatively transverse lining strips to the box, means for delivering one layer of cigarettes to the box, means for inserting a card into the box to overlie said layer, means for thereafter inserting a second layer of cigarettes into the box, and means for selectively turning the cigarettes of the second layer to arrange predetermined portions of the cigarettes in the same plane prior to their delivery into the box.

6. A machine for the automatic packing of several layers of cigarettes into a hinged lid box, with the cigarettes of the top layer bearing inscriptions, comprising a runway, means for moving the box along said runway, means for automatically opening the box during its movement, means for inserting lining strips in the box, a magazine for holding cigarettes in layer form, means for delivering a layer or layers of cigarettes from said magazine into the box, means for holding the box inclined to the plane of delivery of the cigarettes during said delivery, means for depositing an advertising sheet upon the lower layer of cigarettes in the box, means for conveying a top layer of cigarettes for delivery into the box, a device to which the cigarettes are transferred and in which the cigarettes wrongly positioned with respect to their inscriptions are turned to position the inscriptions uppermost, means for pressing the layer of cigarettes together, means for delivering a top layer of cigarettes into the box, and means for closing the box.

7. In a machine as defined in claim 6, rolls from which the lining strips are provided, grippers for drawing off the material of the rolls, means for drawing the strips over the box and maintaining them taut, a plunger for forcing the strips into the box to form sharp folds of the strips to fit the box, and means for severing the strips.

8. In a machine according to claim 6, the addition of a roll from which the lining strip is drawn, grippers for drawing the strip from the roll, a plunger for forcing the strip into the bottom of the box, press cheeks carried by the plunger for opening out automatically for placing the strip, and folding plates for folding the strip against the inner walls and top edge of the box.

9. A machine according to claim 6, the addition of a roll from which the lining strip is drawn, grippers for drawing the strip from the roll, a plunger for forcing the strip into the bottom of the box, press cheeks carried by the plunger for opening out automatically for placing the strip, folding plates for folding the strip against the inner walls and top edge of the box, and a reciprocating arm carrying said folding plates, said plunger and press cheeks being resiliently displaceable with respect to said arm.

10. In a machine according to claim 6, the addition of a roll from which the lining strip is drawn, grippers for drawing the strip from the roll, a plunger for forcing the strip into the bottom of the box, press cheeks carried by the plunger for opening out automatically for placing the strip, folding plates for folding the strip against the inner walls and top edge of the box, a reciprocating arm carrying said folding plates, said plunger and press cheeks being resiliently displaceable with respect to said arm, and wedge-like surfaces on the plunger for pressing the press cheeks outwardly.

11. A machine according to claim 6, including means for holding a stack of advertising sheets to be placed in the box, a concave suction device to pick up the uppermost advertising sheet, means for moving the suction device to maintain the sheet inclined with respect to the box and move the sheet toward the box for gravital delivery on release of the suction.

12. A machine according to claim 6, including a magazine for holding the upper layer of cigarettes, a plunger for moving said upper layer in the direction of the box, a supporting plate formed with longitudinal grooves to receive the cigarettes, a brush movable over the cigarettes for turning the cigarettes into a uniform, slightly overlapping, oblique position.

13. A machine according to claim 6, including a turning device comprising a rotatable sleeve, racks and gear pinions for turning the sleeves, a spring for moving the racks in one direction, and means for locking the sleeves against longitudinal movement.

14. A machine according to claim 6, including a turning device comprising rotatable sleeves, a rack and pinion for turning the sleeves, a control key, a lever operated thereby to release the rack for a selected sleeve, and means for moving the rack longitudinally to turn the sleeve.

15. A machine according to claim 6, including an electric device for supervising the transfer of the cigarettes into the box, said electric device comprising an electric feeler for each cigarette, a normally open circuit for controlling the operation of the machine, the feelers in absence of cigarette transfer being in electrical contact with one side of the open circuit, said feelers during cigarette transfer being individually operated by the cigarettes to engage the other side of the open circuit, all feelers being in electrical connection, whereby in the transfer of an incomplete layer of cigarettes, the feeler corresponding to the omitted cigarette will remain in electrical contact with one side of the open circuit, while the feelers cooperating with the cigarettes in the layer will be moved into contact with the other side of the open circuit to thereby complete the circuit for control of the machine.

GUNTHER MEYER-JAGENBERG.